(12) United States Patent
Kurono et al.

(10) Patent No.: US 9,853,373 B2
(45) Date of Patent: Dec. 26, 2017

(54) TERMINAL BLOCK CONNECTION STRUCTURE IN ROTARY ELECTRIC MACHINE

(71) Applicant: TOYOTA JIDOSHA KABUSHIKI KAISHA, Toyota-shi, Aichi-ken (JP)

(72) Inventors: Yousuke Kurono, Okazaki (JP); Yasuhiro Makido, Toyota (JP); Ryosuke Sasaki, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/285,150

(22) Filed: Oct. 4, 2016

(65) Prior Publication Data

US 2017/0104281 A1 Apr. 13, 2017

(30) Foreign Application Priority Data

Oct. 7, 2015 (JP) .................................. 2015-199522

(51) Int. Cl.
*H01R 4/24* (2006.01)
*H01R 9/24* (2006.01)
*H02K 5/22* (2006.01)

(52) U.S. Cl.
CPC ........... *H01R 9/2416* (2013.01); *H02K 5/225* (2013.01)

(58) Field of Classification Search
CPC .................................................. H01R 9/2416
USPC ........................................................ 439/709
See application file for complete search history.

(56) References Cited

U.S. PATENT DOCUMENTS

| 6,856,057 B2 * | 2/2005 | Kobayashi | H02K 3/522 310/254.1 |
| 6,894,410 B2 * | 5/2005 | Kobayashi | H02K 15/0056 310/239 |
| 7,193,344 B2 * | 3/2007 | Kabasawa | B60K 6/26 180/65.22 |
| 7,430,796 B2 * | 10/2008 | Baumgartner | H02K 3/522 29/596 |
| 7,884,514 B2 * | 2/2011 | Baumgartner | H02K 3/522 310/203 |
| 8,952,584 B2 * | 2/2015 | Asahi | H02K 5/225 310/71 |
| 9,105,990 B2 * | 8/2015 | Akuta | H01R 9/22 |
| 9,543,671 B2 * | 1/2017 | Matsuzaki | H02K 5/225 |

(Continued)

FOREIGN PATENT DOCUMENTS

| JP | 2013062901 A | * | 4/2013 | |
| JP | 2014-128095 A | | 7/2014 | |
| JP | 2015133873 A | * | 7/2015 | ............. H02K 3/522 |

*Primary Examiner* — Tulsidas C Patel
*Assistant Examiner* — Peter G Leigh
(74) *Attorney, Agent, or Firm* — Sughrue Mion, PLLC

(57) ABSTRACT

A terminal block connection structure includes: a connector connected to intermediate parts of a plurality of power lines; a bus bar unit including a plurality of bus bars and at least one resin member; a terminal block being configured such that the distal ends of the plurality of power lines are connected to each other via the bus bar unit. The plurality of bus bars each includes a first plate portion fixed to the terminal block and a second plate portion bent from one end of the first plate portion. The connector is fitted to the resin member which is configured to prevent a movement of the connector in at least one direction out of moving directions of the connector.

5 Claims, 13 Drawing Sheets

(56) References Cited

U.S. PATENT DOCUMENTS

2011/0130049 A1* 6/2011 Kaneshiro .............. H01R 9/226
                                                                 439/709
2013/0038153 A1   2/2013 Asahi
2015/0061426 A1* 3/2015 Nagumo ................ H02K 3/522
                                                                 310/58

* cited by examiner

TERMINAL BLOCK CONNECTION STRUCTURE IN ROTARY ELECTRIC MACHINE

CROSS-REFERENCE TO RELATED APPLICATIONS

The disclosure of Japanese Patent Application No. 2015-199522 filed on Oct. 7, 2015 including the specification, drawings and abstract is incorporated herein by reference in its entirety.

BACKGROUND

1. Technical Field

The present disclosure relates to improvement in a vibration resistance of a terminal block connection structure for a rotary electric machine stator including a plurality of power lines connected to a stator coil of a rotary electric machine, a connector for integrating the plurality of power lines, and a terminal block to which distal ends of the plurality of power lines are connected.

2. Description of Related Art

A rotary electric machine, which is a motor or a generator, includes a stator and a rotor. A plurality of power lines corresponding to a plurality of phases is connected to a stator coil having the plurality of phases in the stator. Terminals of respective power lines are connected to a terminal block fixed to a case. The terminal block electrically connects a plurality of power-source lines to the plurality of power lines. The plurality of power-source lines is connected to a power-source side.

Japanese Patent Application Publication No. 2014-128095 (JP 2014-128095 A) describes a configuration in which three coil terminals are drawn out from a stator coil, one ends of three power lines are connected to respective coil terminals, and the other terminals of respective power lines are connected to a terminal block. In this configuration, the three power lines are integrated by a fixing member (a connector) made of resin. Hereinafter, a terminal-block structure for connecting the power lines to the terminal block is referred to as a connection structure.

SUMMARY

In a configuration in which a plurality of power lines is integrated by a connector, like the configuration described in JP 2014-128095 A, when large vibrations are added at the time of the use of a rotary electric machine, a vibration of the connector may cause a large vibration of the power lines.

Further, in order to improve connection workability between a power line and a stator coil, a distal end of the power line may be connected to a terminal block via a bus bar including an L-shaped portion. The L-shaped portion is constituted by a first plate portion, and a second plate portion rising from one end of the first plate portion. The first plate portion is fixed to the terminal block, and the second plate portion is connected to the distal end of the power line.

The present disclosure is intended to easily improve a vibration resistance of a power line with a configuration in which the power line is connected to a terminal block through a bus bar including an L-shaped portion, in a terminal block connection structure for a rotary electric machine.

According to one aspect of the disclosure, a terminal block connection structure for a rotary electric machine is provided. The rotary electric machine includes a stator coil which has a plurality of phases. The terminal block connection structure includes: a plurality of power lines; a connector; a bus bar unit; and a terminal block. The plurality of power lines is connected to the stator coil, and corresponds to the plurality of phases. The connector is connected to intermediate parts of the plurality of power lines, and configured to integrate the plurality of power lines. The bus bar unit includes a plurality of bus bars and at least one resin member. The plurality of bus bars are connected to respective distal ends of the plurality of power lines, and the resin member connects the plurality of bus bars. The terminal block is configured such that the distal ends of the plurality of power lines are connected to each other via the bus bar unit, and is configured to connect the plurality of power lines to a plurality of power-source lines, respectively. The plurality of bus bars each includes a first plate portion and a second plate portion. The first plate portion is fixed to the terminal block. The second plate portion is bent from one end of the first plate portion, and configured to be connected to the distal end of the power line of a corresponding phase. The connector is fitted to the resin member, and the resin member is configured to prevent a movement of the connector in at least one direction out of moving directions of the connector.

According to the terminal block connection structure for the rotary electric machine of the present disclosure, an L-shaped portion is formed by the first plate portion and the second plate portion, and the plurality of bus bars including the L-shaped portions is connected to each other by the resin member. Further, the connector is fitted to the resin member, so as to prevent the movement of the connector in the at least one direction. Further, the plurality of bus bars is fixed to the terminal block. Hereby, it is possible to easily restrain vibrations of the connector at the time of the use, thereby making it possible to easily improve a vibration resistance of the power line.

According to the above mentioned aspect, the resin member may have a groove provided on a side face of the resin member, the side face facing the connection member. The connector may be configured to be fitted to the groove. The groove may be configured to prevent the movement of the connector in the one direction by walls of the groove.

According to the above mentioned aspect, the connector may have a first projection. The resin member may have a recessed portion on an inner side of the groove. The first projection may be configured to be fitted to the recessed portion. The first projection may prevent a movement of the connector in a direction perpendicular to the one direction.

According to the above mentioned aspect, on an inner side of the groove, the resin member may have a first projection, and the connector may have a recessed portion. The first projection may be configured to prevent a movement of the connector in a direction perpendicular to the one direction such that the first projection is fitted to the recessed portion.

According to the above mentioned aspect, the connector may have a groove provided on a side face of the connector, the side face facing the resin member. The resin member may be configured to be fitted to the groove. The groove may be configured to prevent the movement of the connector in the one direction by walls of the groove.

According to the above mentioned aspect, on an inner side of the groove, the connector may have a first projection, and the resin member may have a recessed portion. The first projection may be configured to prevent a movement of the connector in a direction perpendicular to the one direction such that the first projection is fitted to the recessed portion.

According to the above mentioned aspect, on an inner side of the groove, the resin member may have a first projection, and the connector may have a recessed portion. The first projection may be configured to prevent a movement of the connector in a direction perpendicular to the one direction such that the first projection is fitted to the recessed portion. Note that, in this configuration, the meaning of the "recessed portion" has a groove, in addition to a hole-shaped recessed portion.

According to the above configuration, it is possible to restrain upsizing of the terminal block connection structure and to prevent the movement of the connector in two perpendicular directions. This further makes it possible to improve the vibration resistance of the power line.

According to the above configuration, two bus bars adjacent to each other each may have a second projection. The second projection may project toward its adjacent bus bar from a side face of the first plate portion in a width-direction. The resin member may be configured to embed the second projections of the two bus bars in the resin member. The resin member may be configured to connect the two bus bars. The resin member integrally connects the two bus bars by embedding the projections of the two bus bars therein so that the two bus bars are integrated.

According to the above configuration, it is possible to connect the plurality of bus bars with upsizing of the bus bar being restrained.

According to the terminal block connection structure of the rotary electric machine of the present disclosure, with a configuration in which the power lines are connected to the terminal block via the bus bars including the L-shaped portions, it is possible to easily improve the vibration resistance of the power lines.

BRIEF DESCRIPTION OF THE DRAWINGS

Exemplary embodiments will be described below with reference to the accompanying drawings, in which like numerals denote like elements, and wherein.

DETAILED DESCRIPTION OF EMBODIMENTS

Exemplary embodiments of the present disclosure, with reference to the drawings, are described in detail. A shape, a material, and a number to be described below are exemplifications for descriptions, and they can be changed appropriately according to a specification of a structure for connecting a power line to a terminal block of a rotary electric machine. In the following description, similar elements in all drawings have the same reference sign. Note that a stator constitutes a rotary electric machine in combination with a rotor fixed to a rotating shaft. The rotary electric machine is used as a motor or a generator, or a motor generator having functions of both the motor and the generator.

Figure 1:
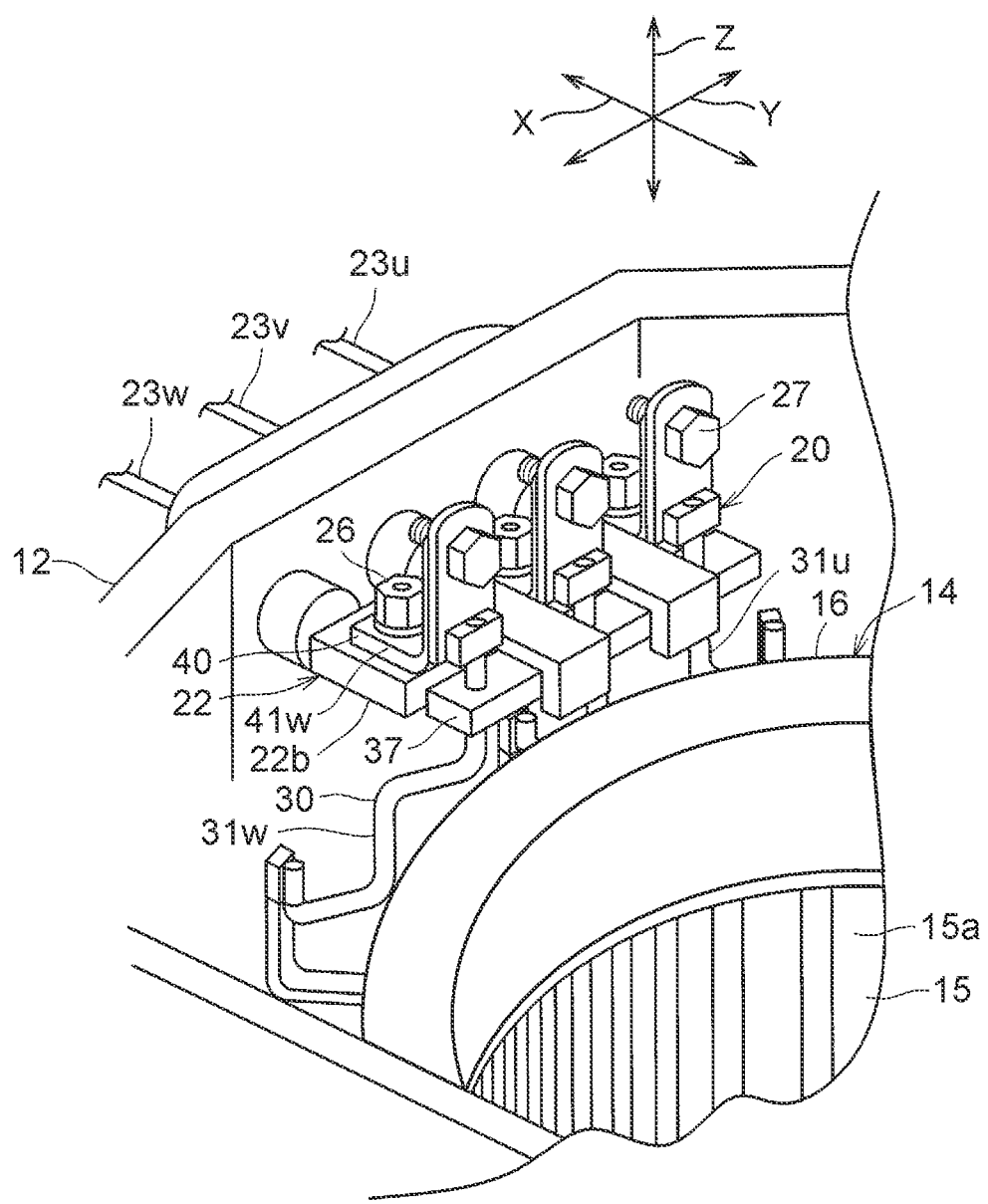
FIG. 1 is a perspective view of a stator fixing structure including a terminal block connection structure for a rotary electric machine according to an embodiment, when viewed inward from an outside of a case.
Figure 2:
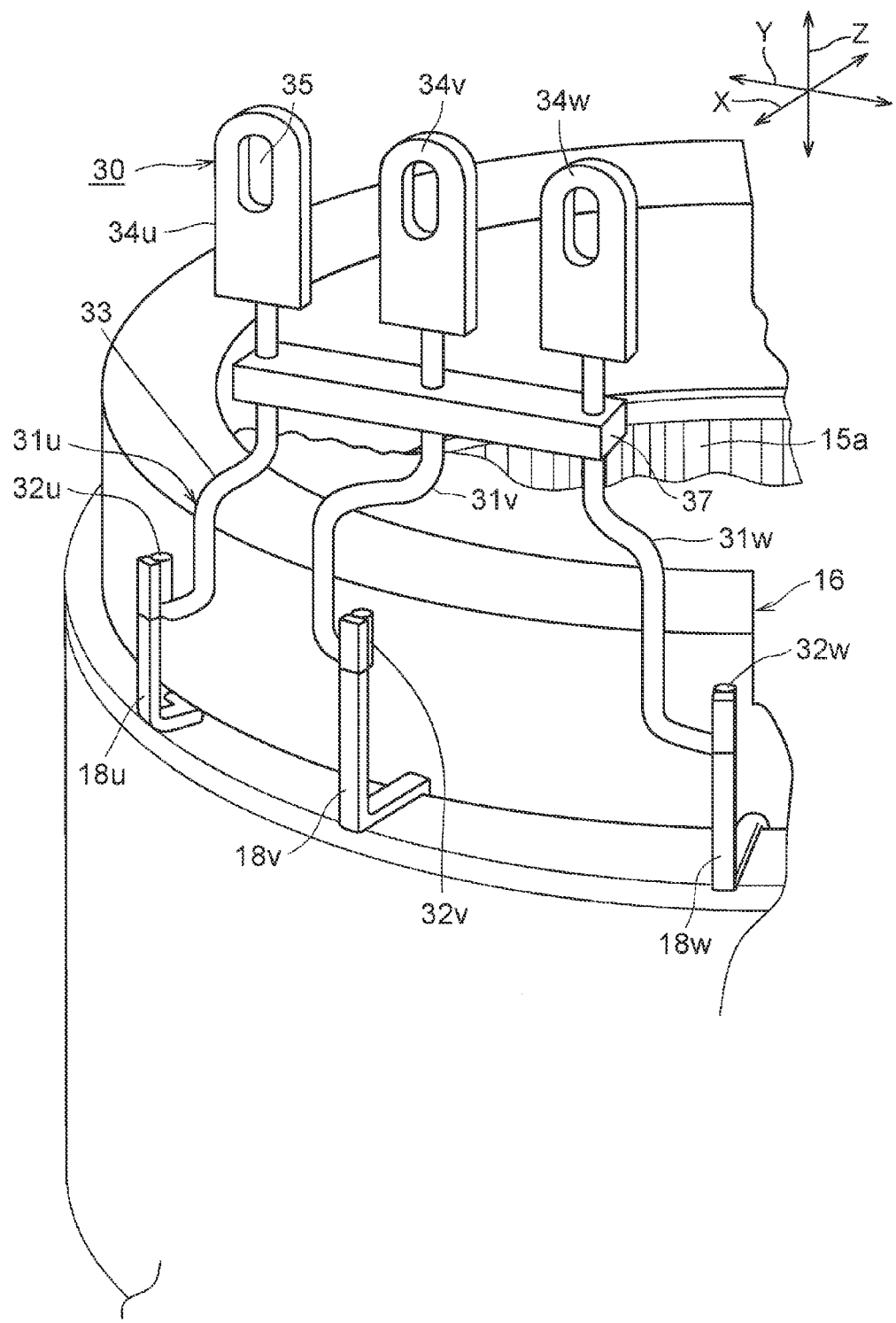
FIG. 2 is a perspective view illustrating a state where a member on a power-line side is connected to a stator coil in the terminal block connection structure.

FIG. 1 is a perspective view of a stator fixing structure 10 including a connection structure 20 when viewed inward from an outside of a case 12. The connection structure 20 is a structure for connecting the power lines 31$u$, 31$v$, 31$w$ to the terminal block of the rotary electric machine according to the embodiment. FIG. 2 is a perspective view illustrating a state where a member on a side of power lines 31$u$, 31$v$, 31$w$ is connected to a three-phase stator coil 16 in the terminal block connection structure 20 shown in FIG. 1.

The stator fixing structure 10 includes the case 12, a stator 14 fixed to an inner side of the case 12, and the terminal block connection structure 20. The stator 14 includes a stator core 15 and the three-phase stator coil 16.

The terminal block connection structure 20 includes a terminal block 22 fixed to the case 12, a power-line integrated member 30, and a bus bar unit 40. The power-line integrated member 30 includes: three power lines 31$u$, 31$v$, 31$w$, as illustrated in FIG. 2, connected to the three-phase stator coil 16; and a connector 37 integrating the three power lines 31$u$, 31$v$, 31$w$. The terminal block 22 is used to connect the three power lines 31$u$, 31$v$, 31$w$ to three power-source lines 23$u$, 23$v$, 23$w$ connected to a power-source side (not shown), respectively. The three power lines 31$u$, 31$v$, 31$w$ and the three power-source lines 23$u$, 23$v$, 23$w$ correspond to three phases. More specifically, the power line 31$u$ and the power-source line 23$u$ corresponds to a U phase, the power line 31$v$ and the power-source line 23$v$ corresponds to a V phase, and the power line 31$w$ and the power-source line 23$w$ corresponds to a W phase. In the following description, the power lines 31$u$, 31$v$, 31$w$ may be generally referred to as the power line 31, and the power-source lines 23$u$, 23$v$, 23$w$ may be generally referred to as the power-source line 23.

The following describes the stator 14 more specifically, with reference to FIG. 1 and FIG. 2. The stator core 15 of the stator 14 has a generally toric shape, and teeth 15a project from a plurality of positions in a circumferential direction on an inner peripheral surface. The three-phase stator coil 16 of the stator 14 includes a U-phase stator coil, a V-phase stator coil, and a W-phase stator coil.

The stator coils of respective phases are wound around the plurality of teeth 15a by distributed winding. The stator coils of respective phases are formed by joining a plurality of conductor segments by welding. For example, the conductor segment is formed by bending a flat wire, which is a conductor wire having a rectangular section.

As illustrated in FIG. 2, coil terminals 18u, 18v, 18w of three phases are formed in one ends of the stator coils of respective phases. The coil terminals 18u, 18v, 18w are formed as follows: the one ends of the stator coils of respective phases are extended generally radially outwardly relative to the stator 14, and then bent generally at a right angle along an axial direction (an up-down direction in FIG. 2) of the stator 14. The other ends (not shown) of the stator coils of the three phases are connected to a bus bar (not shown) that forms a neutral point.

One ends 32u, 32v, 32w of the power lines 31u, 31v, 31w of the U, V, W phases are connected to the coil terminals 18u, 18v, 18w of the three phases by welding. The power line 31 includes a power-line main body 33, and a connecting terminal 34u, 34v, 34w provided in the other end of the power-line main body 33.

The power-line main body 33 is constituted by a conductor element wire and an insulation coating covering the conductor element wire except both ends thereof.

The connecting terminal 34u, 34v, 34w is made of a conductive material such as metal and formed in a plate shape. The connecting terminal 34u, 34v, 34w has a bolt insertion hole 35 formed in a distal end thereof. In the following description, the connecting terminals 34u, 34v, 34w may be generally referred to as the connecting terminal 34.

Figure 3:
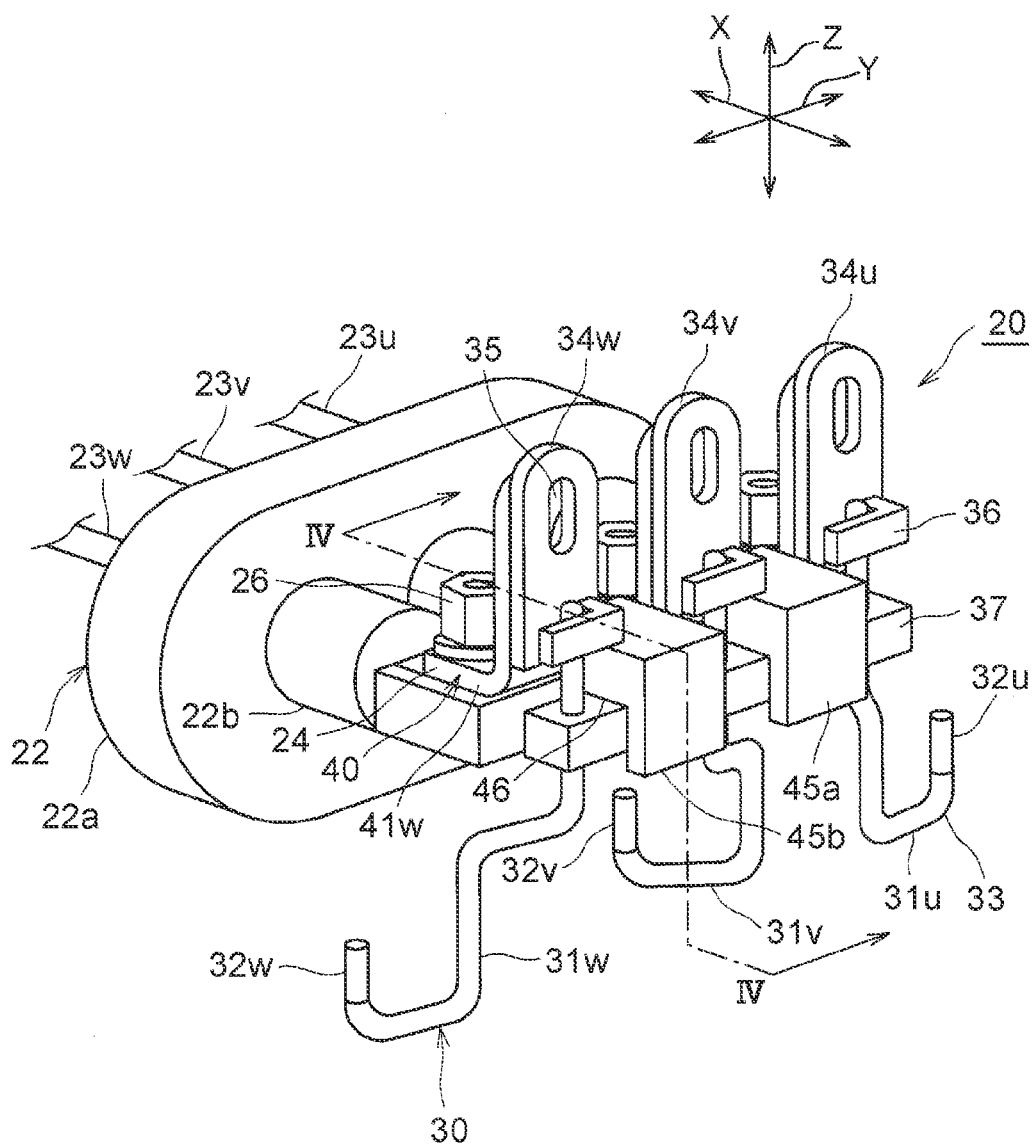
FIG. 3 is a perspective view illustrating the terminal block connection structure taken out from FIG. 1 with some parts being omitted.
Figure 4:
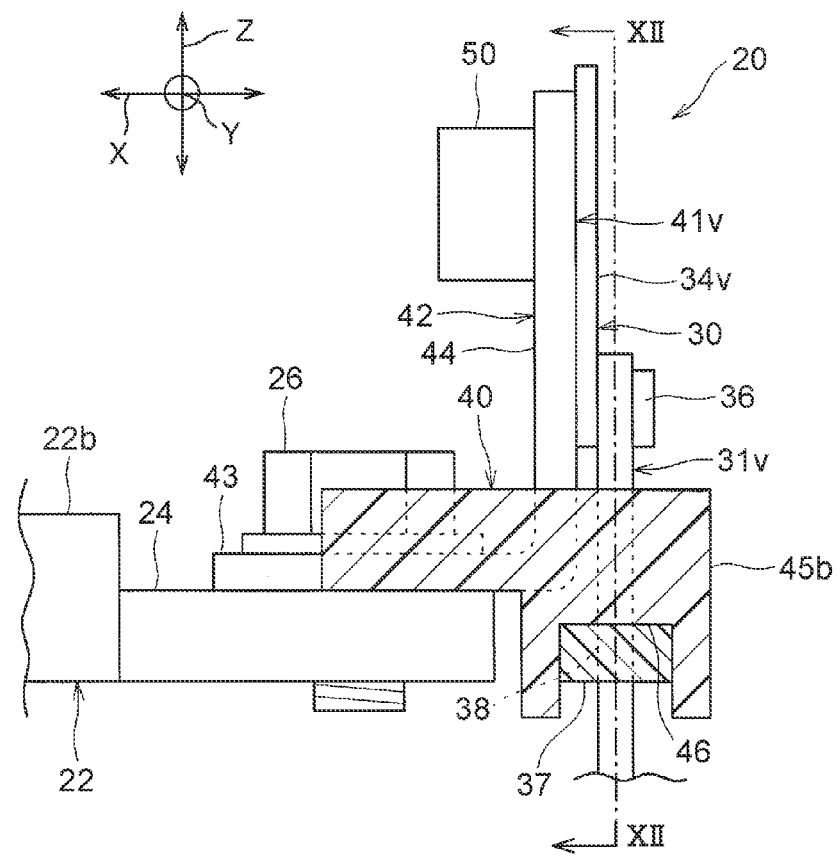
FIG. 4 is a sectional view taken along a line IV-IV in FIG. 3.
Figure 5:
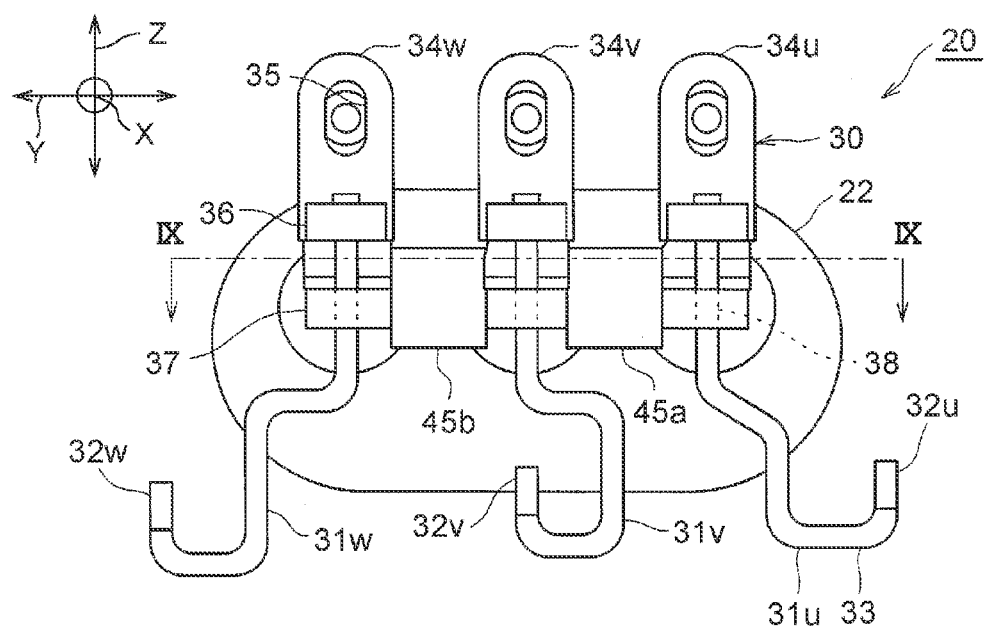
FIG. 5 is a front view of FIG. 3.
Figure 6:
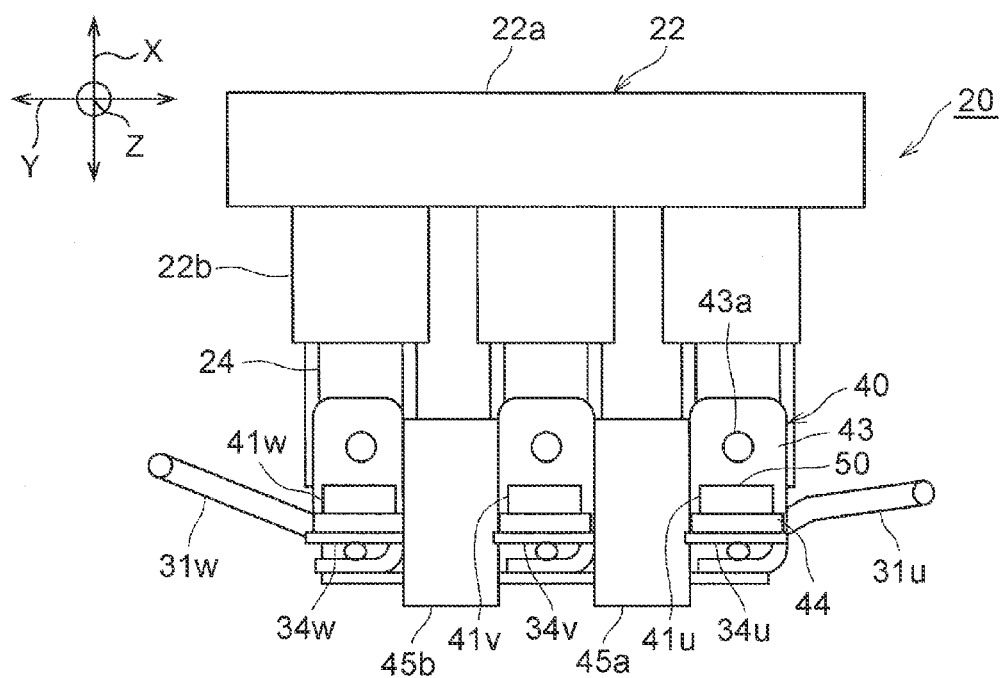
FIG. 6 is a view of FIG. 5 when viewed downward from above with some parts being omitted.

FIG. 3 is a perspective view illustrating the terminal block connection structure 20 taken out from FIG. 1 with some parts being omitted. FIG. 4 is a sectional view taken along a line IV-IV of FIG. 3. FIG. 5 is a front view of FIG. 3. FIG. 6 is a view of FIG. 5 when viewed downward from above with some parts being omitted.

A crimped portion 36 for connecting the power-line main body 33 in a crimped manner is formed in an end of the connecting terminal 34 on a power-line-main-body-33 side. The crimped portion 36 is a tongue piece extending outward from a peripheral edge of the connecting terminal 34. At the time of connecting the power-line main body 33 to the connecting terminal 34, in a state where the other end of the power-line main body 33 is placed on a surface of the connecting terminal 34, the crimped portion 36 is bent toward the surface of the connecting terminal 34 and is further pushed so as to crimp and fix the other end of the power-line main body 33.

The connector 37 is connected to intermediate parts of three power lines 31 on a side closer to the other ends thereof so as to integrate the three power lines 31. The connector 37 forms the power-line integrated member 30 together with the three power lines 31. The connector 37 is made of insulating resin and is formed in a long rectangular-solid shape. The connector 37 has through-holes 38 formed at three positions apart from each other in a longitudinal direction (a Y-direction in FIG. 3 to FIG. 5). Respective intermediate parts of the three power lines 31 are embedded in the connector 37 so as to be integrated with each other, that is, resin-molded, so that the respective intermediate parts of the power lines 31 are inserted into three through-holes 38.

Figure 7:
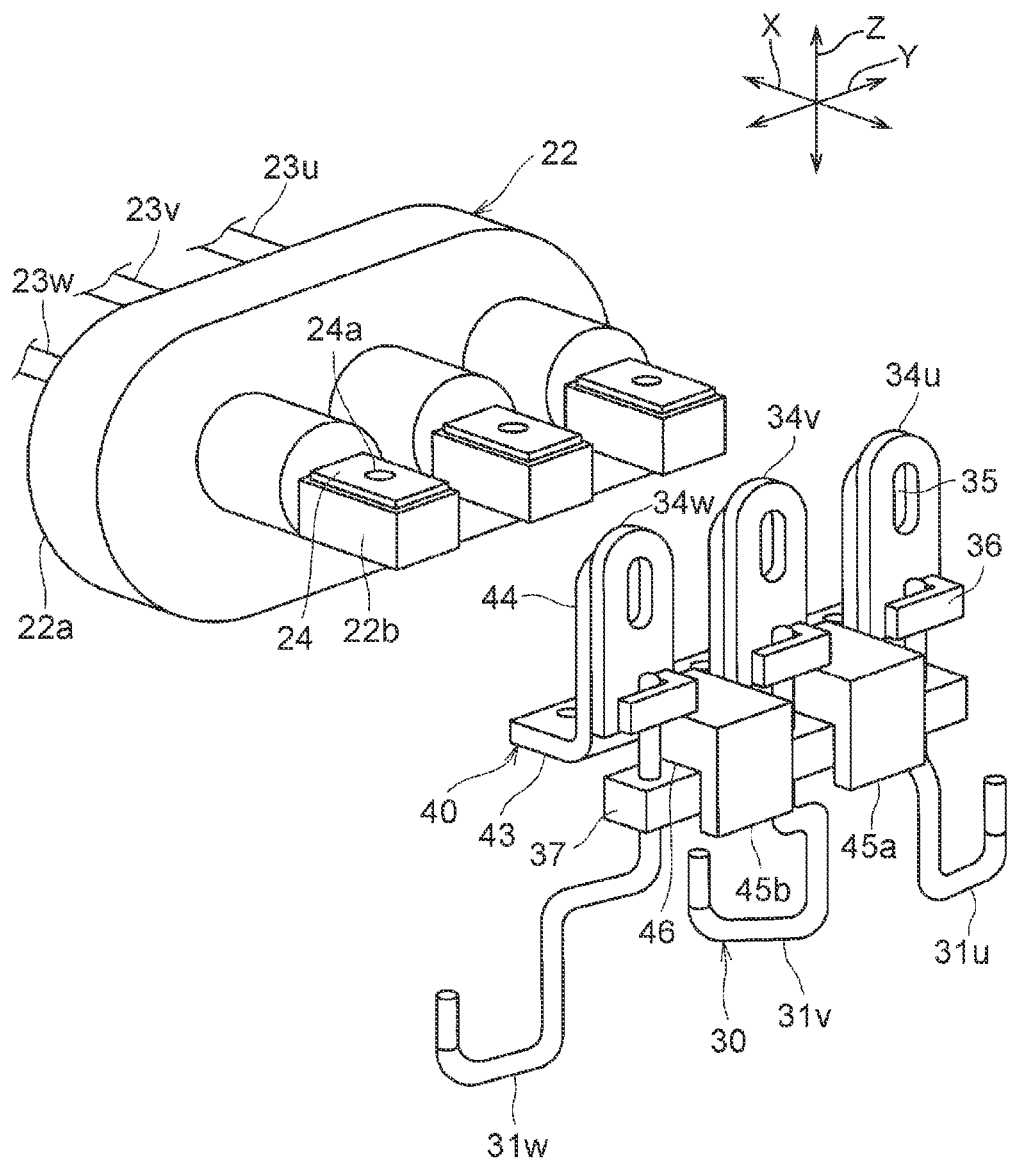
FIG. 7 is a perspective view illustrating a state where a terminal block is separated from the member on the power-line side in FIG. 3.

FIG. 7 is a perspective view illustrating a state where the terminal block 22 is separated from a member on a power-line-31 side in FIG. 3. The connecting terminals 34u, 34v, 34w are connected to the terminal block 22 fixed to the case 12 (FIG. 1) via the after-mentioned bus bar unit 40.

The terminal block 22 includes an outer base portion 22a and inner base portions 22b. The base portions 22a, 22b are made of insulating resin. The outer base portion 22a has a tubular shape having a generally elliptical section, and one end (a left end in FIG. 7) of the outer base portion 22a is opened. External relay terminals (not shown) are placed inside the outer base portion 22a in a state where the external relay terminals are exposed outside, and the power-source lines 23u, 23v, 23w of three phases are connected to the external relay terminals. The power-source lines 23u, 23v, 23w of three phases are connected to terminals of three phases of an inverter (not shown) connected to a direct-current power source outside the case 12 (FIG. 1). The inverter converts a direct current from the direct-current power source into an alternating current, so as to supply a three-phase alternating current to the three-phase stator coil 16 via the power-source lines 23, the terminal block 22, and the power lines 31.

The inner base portions 22b are three columnar parts projecting from the other end (a right end in FIG. 7) of the outer base portion 22a. At the time of attaching the terminal block 22 to the case 12, three insertion holes are formed in the case 12 in advance, and three inner base portions 22b are inserted into the insertion holes from outside the case 12. The after-mentioned bus bar unit 40 is attached to the inner base portion 22b in a state where the inner base portions 22b are inserted into the case 12.

An internal relay terminal 24 is provided on a top face of the inner base portion 22b in an exposed state. The internal relay terminal 24 is made of metal having conductivity and has a plate shape. An electric conductor (not shown) for electrically connecting the internal relay terminal 24 to the external relay terminal is placed inside the inner base portion 22b.

Figure 8:
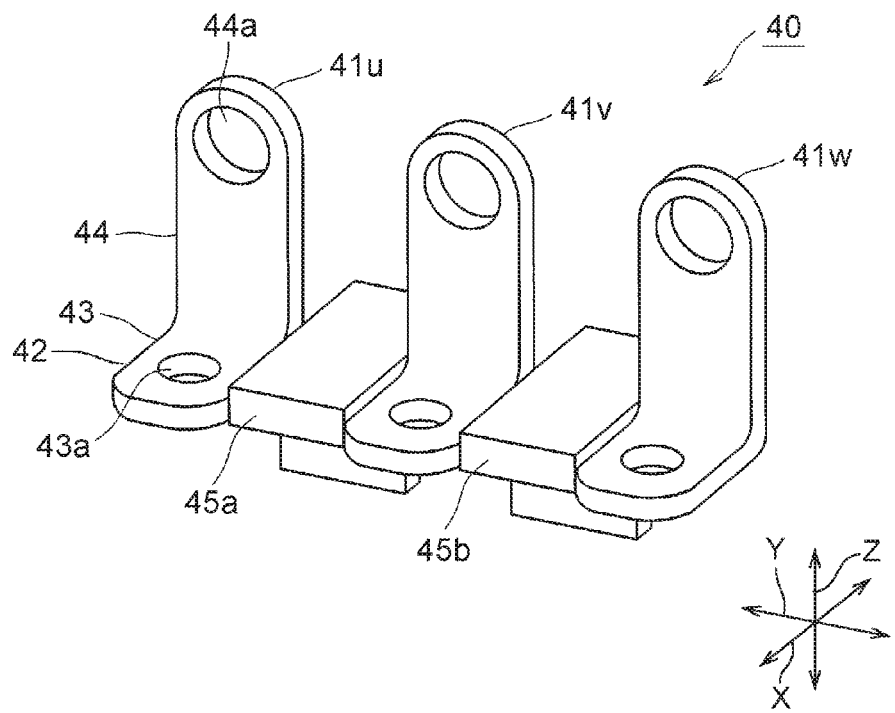
FIG. 8 is a perspective view of a bus bar unit.

FIG. 8 is a perspective view of the bus bar unit 40. The bus bar unit 40 includes three L-shaped bus bars 41u, 41v, 41w, and two resin members 45a, 45b that connect the three L-shaped bus bars 41u, 41v, 41w. As will be described later, the connecting terminals 34 as distal ends of the three power lines 31 (FIG. 7) are connected to the three L-shaped bus bars 41u, 41v, 41w, respectively. The L-shaped bus bars 41u, 41v, 41w are connected to upper faces of the internal relay terminals 24 of the terminal block 22 illustrated in FIG. 7 by bolts 26 (FIG. 3, and FIG. 4). The three L-shaped bus bars 41u, 41v, 41w correspond to three phases, i.e., the U phase, the V phase, and the W phase, respectively. In the following description, the L-shaped bus bars 41u, 41v, 41w may be generally referred to as the L-shaped bus bar 41.

The L-shaped bus bar 41 is made of a conductive material such as metal. The L-shaped bus bar 41 includes an L-shaped portion 42. The L-shaped portion 42 is constituted by a first plate portion 43 and a second plate portion 44 extending in respective directions generally perpendicular to each other. The first plate portion 43 is a first metal plate portion, for example, and the second plate portion 44 is a second metal plate portion, for example. Referring back to FIG. 4, the first plate portion 43 is placed on the upper face of the internal relay terminal 24. Further, the second plate portion 44 is bent from one end (a right end of FIG. 4) of the first plate portion 43 so as to extend in a direction (a Z-direction) along the connecting terminal 34 of the power line 31.

The first plate portion 43 is connected to the internal relay terminal 24 by a bolt 26 (FIG. 3, and FIG. 4) as a first fastening member. At this time, a threaded part of the bolt 26 is passed through an insertion hole 43a (FIG. 8) of the first plate portion 43 and an insertion hole 24a (FIG. 7) of the internal relay terminal 24 and is connected to a nut (not shown) or a threaded hole (not shown) formed in the inner base portion 22b of the terminal block 22.

Further, the connecting terminal 34 of the power line 31 is connected to the second plate portion 44 by a bolt 27 (FIG. 1) as a second fastening member. At this time, a threaded part of the bolt 27 is passed through an insertion hole 35 (FIG. 7) of the connecting terminal 34 and an insertion hole 44a (FIG. 8) of the second plate portion 44, and is connected to a nut 50 (FIG. 4). Hereby, the second plate portion 44 is connected to a distal end of the power line 31 of a corresponding phase by the bolt 27. FIG. 4 illustrates a state where the nut 50 is fixed to the second plate portion 44 in advance by bonding or welding, but the nut 50 may be is provided separately from the second plate portion 44. As long as the L-shaped bus bar 41 includes the L-shaped portion 42, another plate portion may be connected to an end of the L-shaped portion 42.

As illustrated in FIG. 7 and FIG. 8, three L-shaped bus bars 41 are arranged side by side along a direction (the Y-direction) parallel to the longitudinal direction of the connector 37. The L-shaped bus bars 41 adjacent to each other are placed at an interval in the Y-direction. A corresponding one of the resin members 45a, 45b is placed between the L-shaped bus bars 41 adjacent to each other, so that the corresponding one of the resin members 45a, 45b connects two L-shaped bus bars 41 thus adjacent to each other.

More specifically, among the three L-shaped bus bars 41, two L-shaped bus bars 41u, 41v provided in one end (a left end of FIG. 8) and in an intermediate position are connected to each other by one resin member 45a out of two resin members 45a, 45b. Further, two L-shaped bus bars 41w, 41v provided in the other end (a right end of FIG. 8) and in the intermediate position are connected to each other by the other resin member 45b. The resin members 45a, 45b are made of insulating resin.

Figure 9:
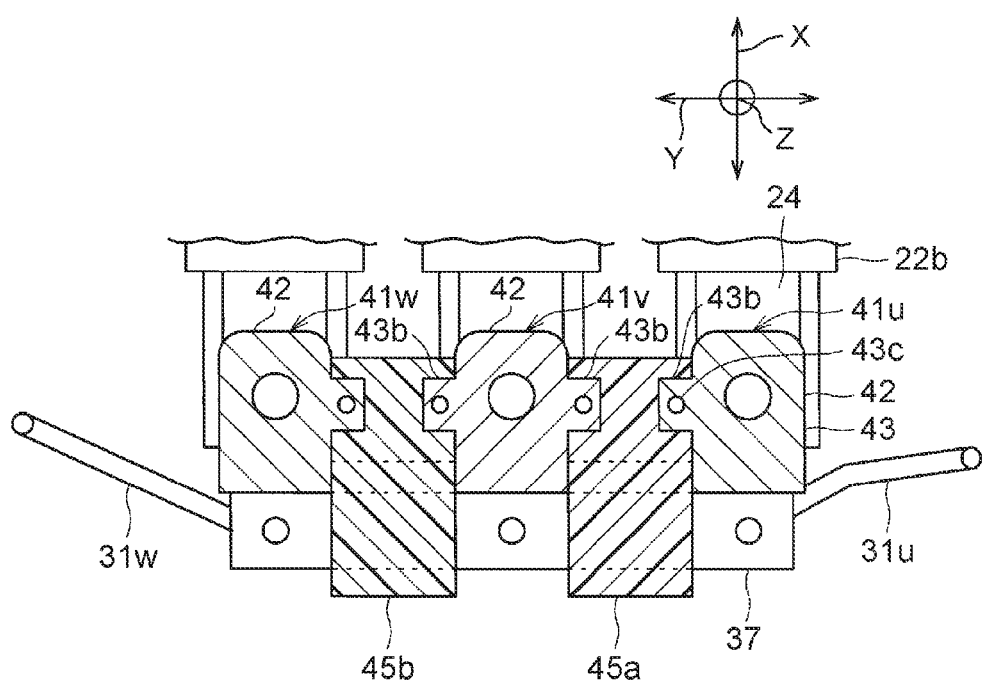
FIG. 9 is a sectional view taken along a line IX-IX in FIG. 5.

With reference to FIG. 9, the following describes a connection portion between the resin member 45a, 45b and the L-shaped bus bar 41. FIG. 9 is a sectional view taken along a line IX-IX in FIG. 5. The L-shaped bus bar 41 includes a projection 43b on one side face or on either side face of the first plate portion 43 of the L-shaped bus bar 41 in a width direction (the Y-direction). More specifically, each of two L-shaped bus bars 41 adjacent to each other includes a projection 43b projecting in the width direction of the first plate portion 43 from a width-direction side face of the first plate portion 43 toward the its adjacent L-shaped bus bar 41. A through-hole 43c is formed in the projection 43b.

With reference to FIG. 4, and FIG. 8 described earlier, a shape of the other resin member 45b is described. One end portion of the resin member 45b (a left part in FIG. 4, a left lower part in FIG. 8) has a generally rectangular solid shape extending in the X-direction, and the other end portion (a right part in FIG. 4, a right upper part of FIG. 8) has a generally block shape having a thickness larger than the one end portion in the Z-direction. Further, the other end portion of the resin member 45b has a groove 46 formed on a lower face. The groove 46 is configured such that the connector 37 is fitted inside of the groove 46, and will be described later more specifically. A shape of one resin member 45a (FIG. 4) is similar to the other resin member 45b.

As illustrated in FIG. 9, the one resin member 45a is configured such that the projection 43b of the L-shaped bus bar 41u and the projection 43b of the L-shaped bus bar 41v are embedded and integrated, that is, resin-molded, in both ends of the resin member 45a in an integrated manner in the width direction (the Y-direction) of the L-shaped bus bars 41. Hereby, two L-shaped bus bars 41u, 41v are connected to each other in an integrated manner.

Further, the other resin member 45b is configured such that the projection 43b of the L-shaped bus bar 41w and the projection 43b of the L-shaped bus bar 41v are resin-molded in both ends of the resin member 45b in the width direction (the Y-direction) of the L-shaped bus bars 41, so that two L-shaped bus bars 41w, 41v are connected to each other in an integrated manner. The resin members 45a, 45b can be formed by injection molding of resin.

At the time of the resin molding, part of the resin members 45a, 45b enter the through-holes 43c of the projections 43b. This makes it possible to improve a connection strength between the resin members 45a, 45b and the L-shaped bus bars 41, and to prevent the projections 43b from moving in a direction where the projections 43b fall out of the resin members 45a, 45b.

Further, since the projections 43b of the L-shaped bus bars 41 are connected to the resin members 45a, 45b, it is possible to connect a plurality of L-shaped bus bars 41 while avoiding enlarging the L-shaped bus bars 41, differently from a case where the whole width-direction end portions of the L-shaped bus bars 41 are resin-molded.

As described above, since the internal relay terminals 24 of the terminal block 22 are connected to the connecting terminals 34 of the power lines 31 via the L-shaped bus bars 41, the power-source lines 23 of three phases are electrically connected to the power lines 31 of three phases.

Figure 11:
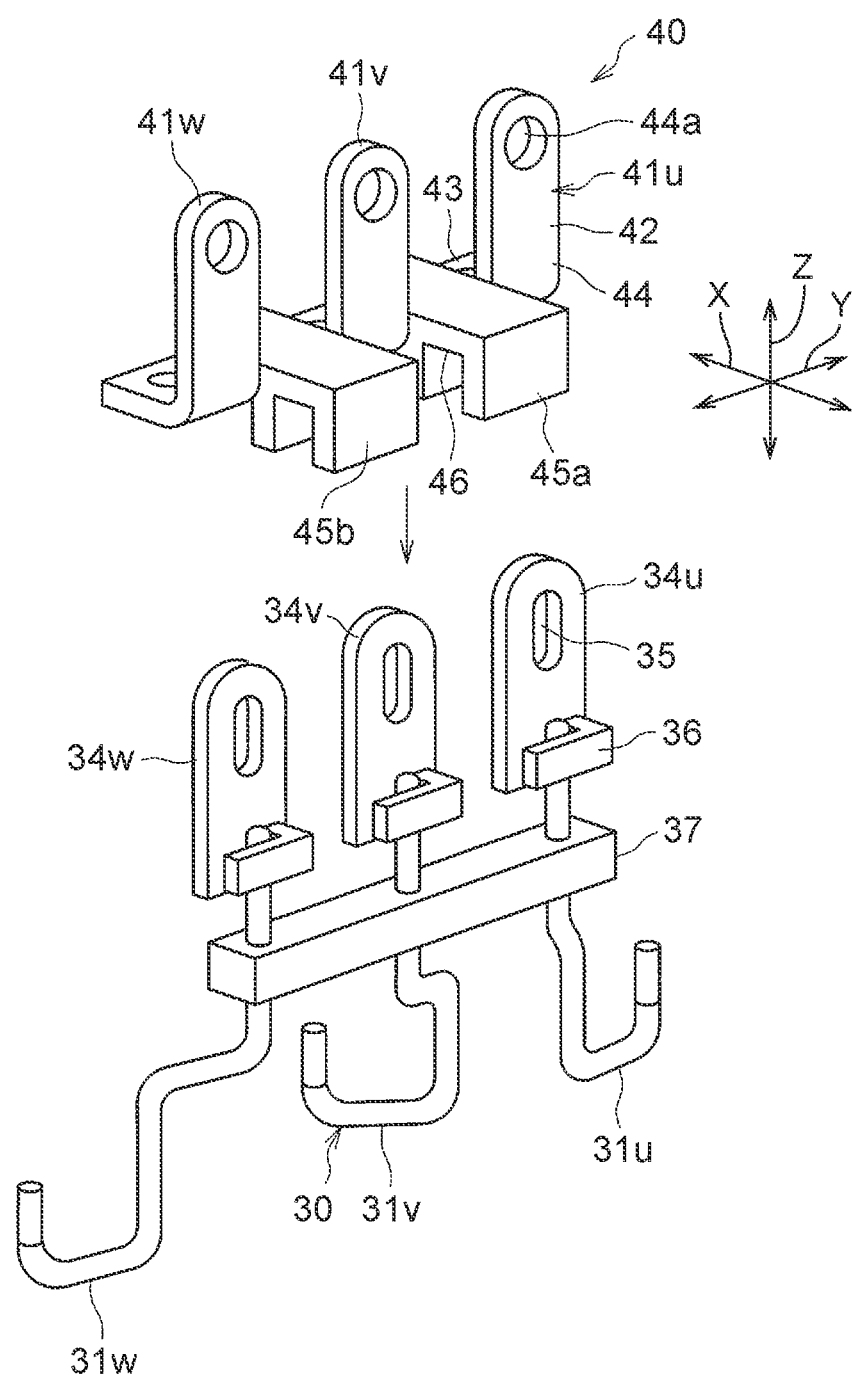
FIG. 11 is a perspective view illustrating a state where a resin member of a bus bar unit is fitted to a connector in the member on the power-line side illustrated in FIG. 7.

Further, the resin member 45a, 45b has the groove 46 formed on a side face of the resin member on a side facing the connector 37 in a thickness direction (the Z-direction) of the resin member 45a, 45b. The connector 37 is fitted into the groove 46. More specifically, as illustrated in FIG. 4 and FIG. 11 (described later), the resin member 45a, 45b has the groove 46 formed on its lower face on the side facing the connector 37, and the groove 46 is formed in the other end part (a right part in FIG. 4, and FIG. 11) of the resin member 45a, 45b. A sectional shape of the groove 46 of the resin member 45a, 45b, in terms a plane perpendicular to the longitudinal direction (the Y-direction) of the connector 37, is a shape cut in a rectangular shape. Both ends of the groove 46 are opened on both side faces of the resin member 45a, 45b in the width direction (the Y-direction). As illustrated in FIG. 3 and FIG. 4, the connector 37 is fitted into the groove 46 of the resin member 45a, 45b substantially without any gap. That is, the connector 37 is placed so as to intersect with the resin member 45a, 45b. A movement of the connector 37 toward both sides in the X-direction, which is a width direction of the connector 37, is prevented by inner walls of the groove 46. Further, a movement of the connector 37 toward one side (an upper side in FIG. 4 and FIG. 11) in the Z-direction perpendicular to the width direction and the longitudinal direction (the X-direction and the Y-direction) of the connector 37 is prevented by an inner top face of the groove 46. This accordingly makes it possible to easily improve a vibration resistance of each power line 31 as will be described later.

The following describes a connecting method for the terminal block 22, the bus bar unit 40, and the power-line integrated member 30. First, as illustrated in FIG. 2, the power-line integrated member 30 is formed by integrating the three power lines 31 with the connector 37. The power-line integrated member 30 is connected to the coil terminals 18u, 18v, 18w of the stator coil 16 by welding. At this time, the terminal block 22 and the connecting terminals 34 of the power lines 31 as illustrated in FIG. 3 are connected to each other via the L-shaped bus bars 41, which are different members from the connecting terminals 34. This makes it possible to attain improvement of workability of a connection operation of the power lines 31 and the three-phase stator coil 16 (FIG. 2).

Figure 10:
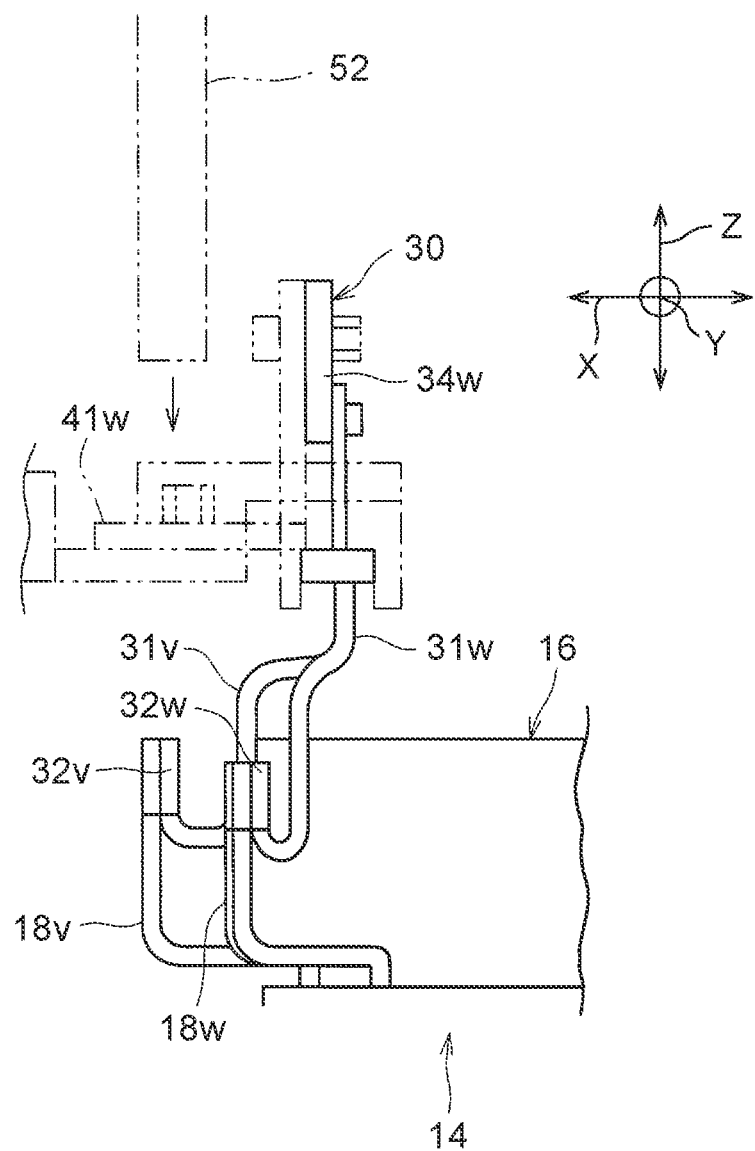
FIG. 10 is a view of an operation of connecting the member on the power-line side is connected to the stator coil in the terminal block connection structure, when viewed from an outer peripheral side of the stator coil.

The following describes this point with reference to FIG. 10. FIG. 10 is a view of an operation of connecting the power-line integrated member 30 as a member on the power-line-31 side to the three-phase stator coil 16 in the terminal block connection structure 20, when viewed from an outer peripheral side of the three-phase stator coil 16. When the connection operation is performed, the stator 14 is first placed such that its axial direction is along the up-down direction (along the z-axis). One ends 32u (FIG. 2), 32v, 32w of the power lines 31 of respective phases of the power-line integrated member 30 are put on axially extending ends of the coil terminals 18u (FIG. 2), 18v, 18w of their corresponding phases. The power-line integrated member 30 is held by a jig (not shown) in this state, and in the state, a welding torch 52 is moved downward from above the stator 14. The one ends 32u, 32v, 32w of the power lines 31 are joined to the coil terminals 18u, 18v, 18w by the welding torch 52. When the welding torch 52 is moved downward in FIG. 10, the connecting terminals 34 of the power lines 31 extend along an axial direction of the stator 14, and the L-shaped bus bars 41 have not been connected to the connecting terminals 34 yet. This makes it possible to easily prevent the end portions of the power lines 31 from disturbing the welding operation, thereby making it possible to attain improvement of workability of the connection operation of the power lines 31 and the three-phase stator coil 16.

In a state where the power-line integrated member 30 is connected to the stator coil 16, the stator 14 is fixed inside the case 12, as illustrated in FIG. 1. At this time, a core-side attachment portion (not shown) provided on an outer peripheral surface of the stator core 15 can be connected, by bolts or the like, to a case-side attachment portion (not shown) formed in the case 12. Then, as described above, the inner base portions 22b of the terminal block 22 are inserted through the insertion holes from outside the case 12. The inner base portions 22b may be inserted inside the case 12 before the stator 14 is fixed to the case 12. After that, the bus bar unit 40 is inserted from outside the case 12 in the axial direction of the stator 14, so that the L-shaped bus bars 41 of the bus bar unit 40 are connected to the internal relay terminals 24 of the terminal block 22 and the connecting terminals 34 of the power lines 31. At this time, as illustrated in FIG. 11, the grooves 46 formed in the resin members 45a, 45b of the bus bar unit 40 are fitted from above to the connector 37 at two positions in the longitudinal direction. Hereby, the stator fixing structure 10 including the terminal block connection structure 20 is formed.

According to the terminal block connection structure 20, three L-shaped bus bars 41 are connected by the resin members 45a, 45b. Further, the connector 37 is fitted into the grooves 46 of the resin members 45a, 45b. This prevents the movement of the connector 37 in the X-direction, which is the width direction of the connector 37. Further, the three L-shaped bus bars 41 are fixed to the terminal block 22. Hereby, at the time of the use, the vibration of the heavy connector 37 can be restrained. Accordingly, with a configuration in which the power lines 31 are connected to the terminal block 22 via the L-shaped bus bars 41, it is possible to easily improve a vibration resistance of the power lines 31 connected to the connector 37. As a result, it is possible to improve durability of the connecting portion between the power lines 31 and the three-phase stator coil 16.

Further, since the connector 37 is fitted into the grooves 46 of the resin members 45a, 45b, it is not necessary to form a large groove for fitting in the connector 37. This makes it possible to increase a whole thickness of the connector 37 in the Z-direction, thereby making it possible to increase rigidity of the connector 37.

In the meantime, as a configuration of a comparative example in which a power line is connected to a terminal block, it is conceivable that a path in a middle of the power line is fixed to a case so as to restrain vibrations of the power line. However, in this comparative example, depending on an inner shape of the case or an arrangement state of its internal parts, such a vibration restraint structure cannot be employed easily. In the embodiment, it is possible to restrain vibrations of the power lines 31 with a simple configuration without such an inconvenience.

Further, in the present embodiment, since the bus bar unit 40 is formed such that three L-shaped bus bars 41 are integrated by the resin members 45a, 45b, a handling property of the three L-shaped bus bars 41 improves. This makes it possible to improve workability at the time of assembling to the terminal block 22 and the power lines 31. Further, in a state where one L-shaped bus bar 41 is connected to the terminal block 22 by a bolt, movements of the remaining L-shaped bus bars 41 are restricted. Hereby, at the time of fastening the remaining L-shaped bus bars 41 by bolts, a part including the L-shaped bus bar 41 that has been already fastened serves as a whirl-stopper. Further, the resin members 45a, 45b of the bus bar unit 40 are fitted to the connector 37 to be placed thereon, which can be used for positioning at the time of assembling. Hereby, it is possible to reduce or eliminate the use of the jig at the time of assembling, thereby making it possible to further improve assembly workability.

Figure 12:
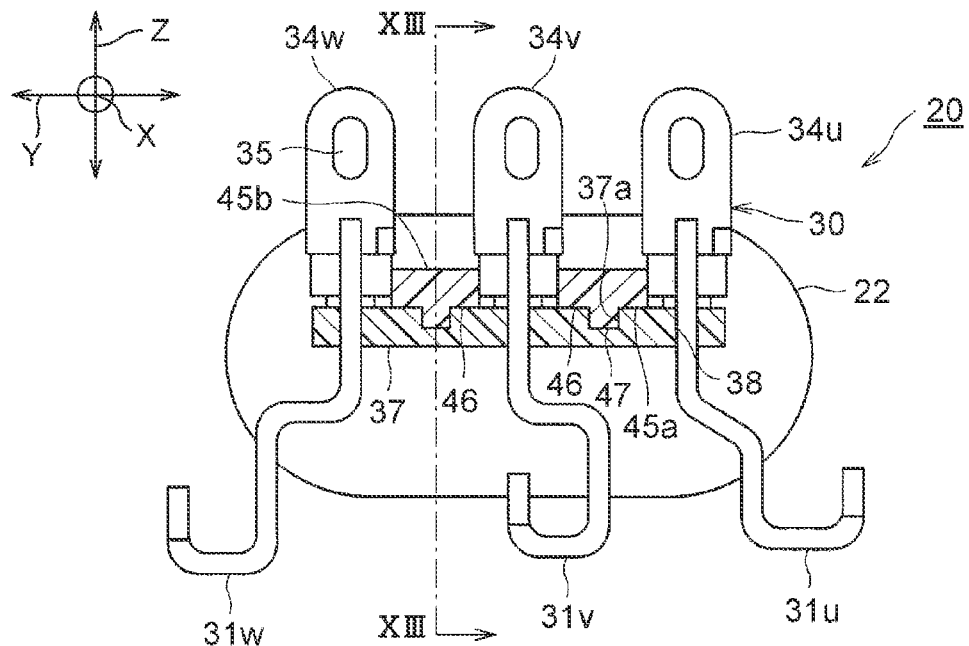
FIG. 12 is a view corresponding to a section along a line XII-XII in FIG. 4 in another example of the terminal block connection structure for the rotary electric machine of the embodiment.
Figure 13:
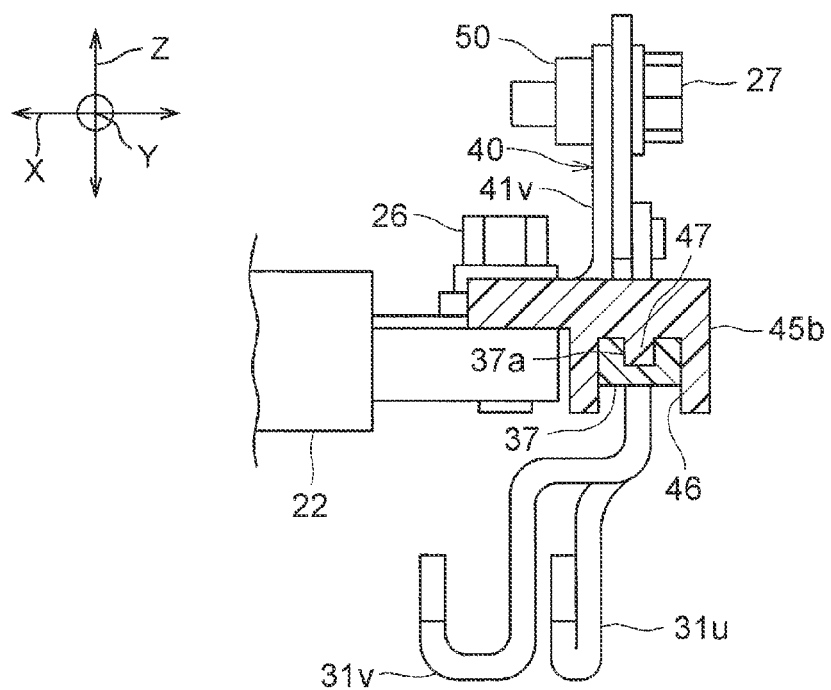
FIG. 13 is a sectional view taken along a line XIII-XIII in FIG. 12.

FIG. 12 is a view corresponding to a section taken along a line XII-XII in FIG. 4 in another example of the terminal block connection structure 20 of the embodiment. FIG. 13 is a sectional view taken along a line XIII-XIII in FIG. 12. In a configuration illustrated in FIG. 12, and FIG. 13, on an inner side of a groove 46 of a resin member 45a, 45b constituting a bus bar unit 40, one of the resin member 45a, 45b and a connector 37 has a projection and the other side thereof has a recessed portion such that the projection is fitted to the recessed portion. More specifically, on the inner side of the groove 46, a corresponding resin member 45a, 45b has a groove-side projection 47 projecting from a bottom face of the groove 46. The groove-side projection 47 has a round or rectangular pillar shape. Further, on the inner side of the groove 46, the connector 37 has a hole-shaped recessed portion 37a formed in a part opposed to the bottom face of the groove 46. When the groove-side projection 47 is fitted inside the recessed portion 37a, the connector 37 is prevented from moving in its longitudinal direction (the Y-direction), which is a direction perpendicular to the X-direction as one direction of the connector 37. The recessed portion 37a has a shape generally fitted to the groove-side projection 47.

According to the above configuration, it is possible to more stably prevent the connector 37 from moving in the X-direction with respect to the resin member 45a, 45b, and it is also possible to prevent the connector 37 from moving in the longitudinal direction (the Y-direction) of the connector 37, the longitudinal direction being perpendicular to the X-direction. This makes it possible to prevent the connector 37 from moving in two perpendicular directions, thereby making it possible to more stably restrain vibrations of the connector 37. This accordingly makes it possible to further improve a vibration resistance of power lines 31 connected to the connector 37. Further, since a fitting structure between the recessed portion 37a and the groove-side projection 47 is placed in the groove 46, it is possible to restrain upsizing of the terminal block connection structure 20. Other configurations and effects are the same as in the configuration illustrated in FIG. 1 to FIG. 11.

Figure 14:
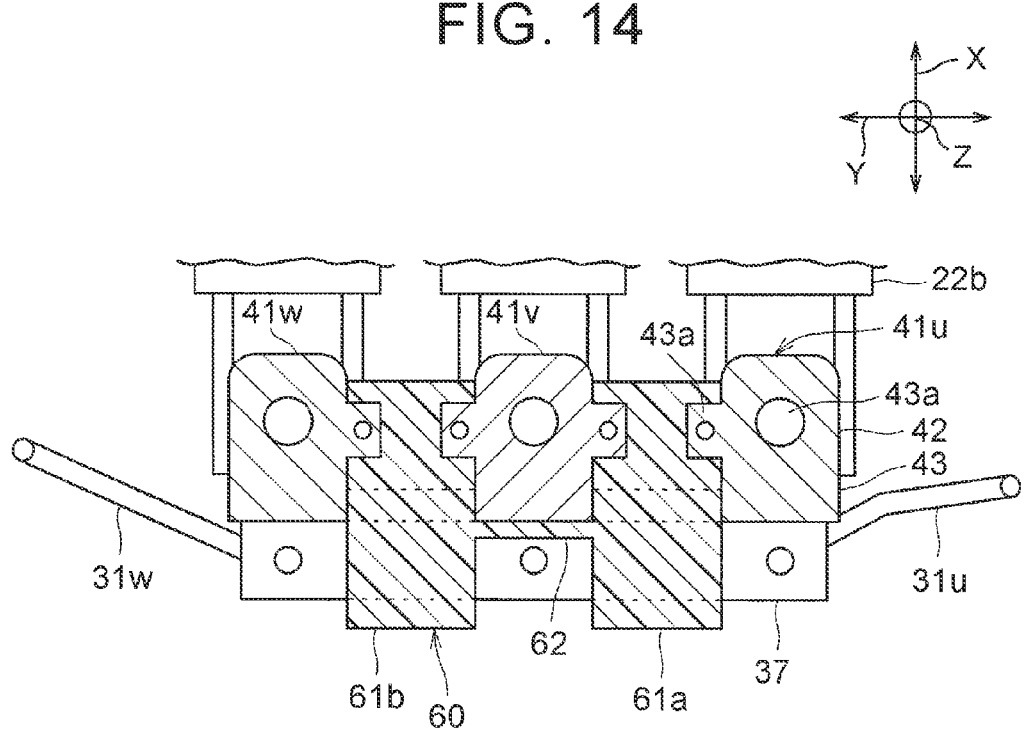
FIG. 14 is a view corresponding to FIG. 9 in another example of the terminal block connection structure for the rotary electric machine of the embodiment.

FIG. 14 is a view corresponding to FIG. 9 in another example of the terminal block connection structure of the embodiment. In a configuration illustrated in FIG. 14, three L-shaped bus bars 41 are connected by one resin member 60. More specifically, the L-shaped bus bars 41 adjacent to each other are connected by two resin portions 61a, 61b. Then, the two resin portions 61a, 61b are connected by a columnar connection portion 62 made of resin, at a position distanced toward a power-line-31 side (a lower side in FIG. 14) from an intermediate bus bar 41v among the three L-shaped bus bars 41. Hereby, the resin member 60 is formed.

According to the above configuration, at the time of forming the resin member 60 by injection molding of resin, only one resin injection gate (not shown) is provided in a die (not shown). Other configurations and effects are the same as in the configuration of FIG. 1 to FIG. 11.

Figure 15:
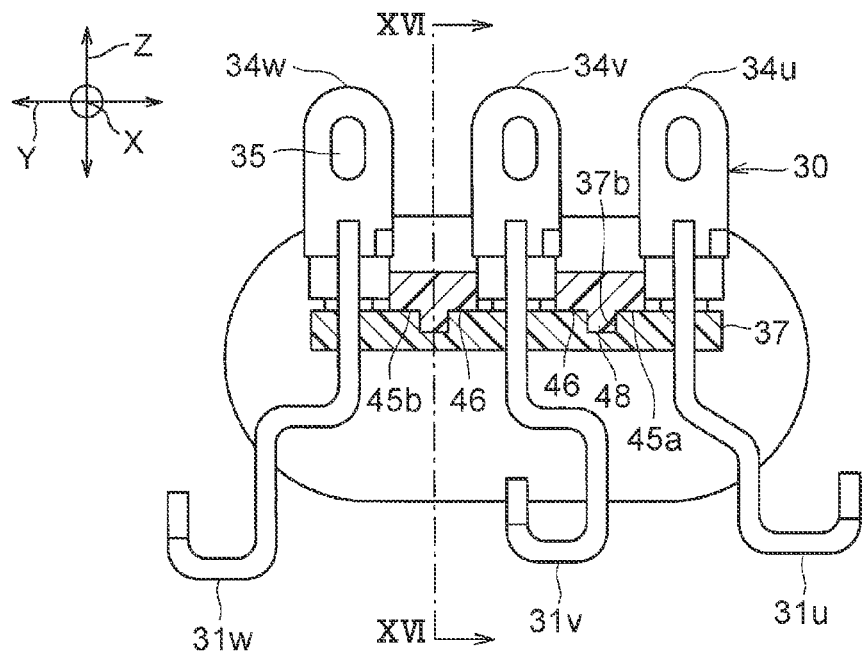
FIG. 15 is a view corresponding to FIG. 12 in another example of the terminal block connection structure for the rotary electric machine of the embodiment.
Figure 16:
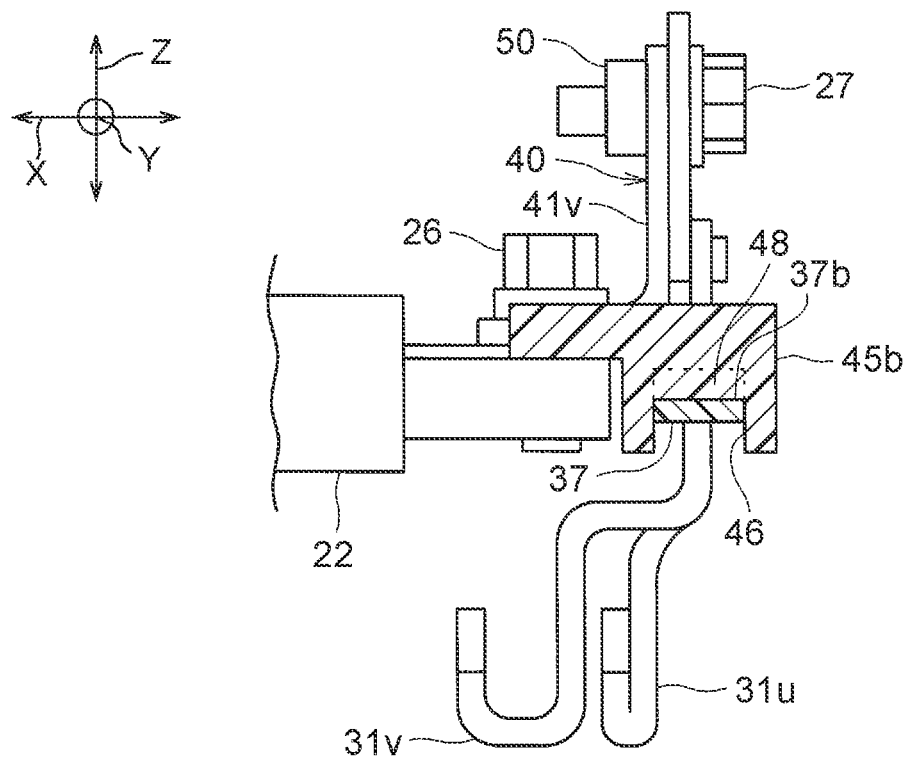
FIG. 16 is a sectional view taken along a line XVI-XVI in FIG. 15.

FIG. 15 is a view corresponding to FIG. 12 in another example of the terminal block connection structure of the embodiment. FIG. 16 is a sectional view taken along a line XVI-XVI in FIG. 15. In a configuration illustrated in FIG. 15 and FIG. 16, a groove-side projection 48 is formed on a bottom face of a groove 46 of a resin member 45a, 45b constituting a bus bar unit 40, such that the groove-side projection 48 projects continuously in a plate shape over the whole X-direction of the groove 46 from an intermediate part in a width direction (the Y-direction) of the bottom face of the groove 46. Further, the connector 37 has an internal groove 37b formed in a part opposed to the bottom face of the groove 46. The internal groove 37b corresponds to a recessed portion. The internal groove 37b is formed over a width direction (the X-direction) of the connector 37. The groove-side projection 48 is fitted inside the internal groove 37b. The internal groove 37b has a shape generally fitted to the groove-side projection 48. Hereby, on an inner side of the groove 46, a corresponding resin member 45a, 45b has the groove-side projection 48, and the connector 37 has the internal groove 37b fitted to the groove-side projection 48.

Even in the above configuration, similar to the configuration in FIG. 12 and FIG. 13, it is possible to prevent the connector 37 from moving in two perpendicular directions, thereby making it possible to more stably restrain vibrations of the connector 37. Further, since a fitting portion between the internal groove 37b and the groove-side projection 48 is placed in the groove 46, it is possible to restrain upsizing of the terminal block connection structure. Other configurations and effects are the same as in the configuration illustrated in FIG. 1 to FIG. 11 or the configuration illustrated in FIG. 12 and FIG. 13.

In the configuration of FIG. 12, and FIG. 13 or in the configuration illustrated in FIG. 15 and FIG. 16, on the inner side of the groove 46 of the resin member 45a, 45b, the resin member 45a, 45b has the projection and the connector 37 has the recessed portion fitted to the projection. In the meantime, in the configuration of FIG. 12 and FIG. 13 or in the configuration of FIG. 15 and FIG. 16, on the inner side of the groove 46 of the resin member 45a, 45b, the connector 37 may have a projection, and the resin member 45a, 45b may have a recessed portion fitted to the projection.

Figure 17:
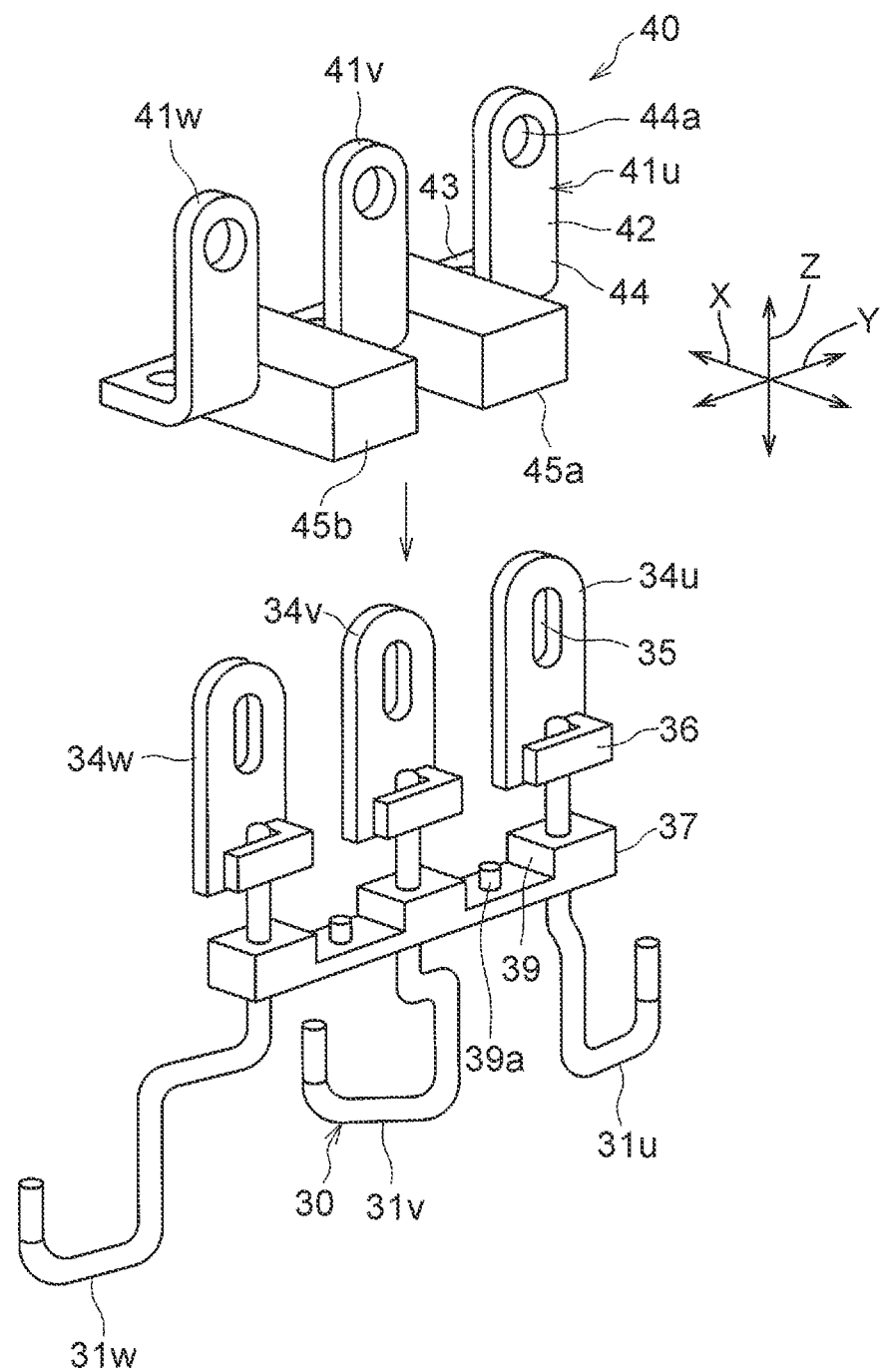
FIG. 17 is a view corresponding to FIG. 11 in another example of the terminal block connection structure for the rotary electric machine of the embodiment.

FIG. 17 is a view corresponding to FIG. 11 in another example of the terminal block connection structure of the embodiment. In a configuration illustrated in FIG. 17, a groove is not formed on a lower face of a resin member 45a, 45b of a bus bar unit 40, but a groove 39 is formed in a connector 37. More specifically, the connector 37 has a groove 39 formed on a side opposed to of the resin member 45a, 45b of the bus bar unit 40. Further, a columnar groove-side projection 39a is formed to project in a central part of a bottom face of the groove 39. Further, the resin member 45a, 45b of the bus bar unit 40 is formed generally in a rectangular solid shape.

Further, in the resin member 45a, 45b, a recessed portion (not shown) is formed in a part opposed to a bottom face of the groove 39 so that the groove-side projection 39a enters therein. The resin members 45a, 45b are fitted into two grooves 39 distanced from each other in a longitudinal direction of the connector 37, so that a movement of the connector 37 in the longitudinal direction (the Y-direction), which is one direction, is prevented by inner walls of the grooves 39. Further, on inner sides of the grooves 39 of the connector 37, the groove-side projections 39a of the connector 37 are fitted into the recessed portions of the resin members 45a, 45b substantially without any gap. Hereby, the connector 37 is prevented from moving in the X-direction, which is a direction perpendicular to the one direction of the connector 37. This makes it possible to prevent the connector 37 from moving in two perpendicular directions, thereby making it possible to stably restrain vibrations of the connector 37. Meanwhile, in such a configuration, a relatively large groove 39 is formed in the connector 37. In view of this, from a viewpoint of increasing the rigidity of the connector 37, the configuration of FIG. 1 to FIG. 11 is more preferable than the configuration of FIG. 17. Other configurations and effects are the same as in the configuration of FIG. 1 to FIG. 11. In the configuration of FIG. 17, on the inner side of the groove 39, a recessed portion and a groove-side projection fitted to the recessed portion may be formed reversely in the resin member 45a (or 45b) and the connector 37.

Each of the above exemplary embodiments describes the connector 37 made of resin, but if the insulating property can be increased sufficiently by thickening the insulation coating of the power line 31, the connector 37 can be made of metal such as ferrum or aluminum alloy.

Further, the above exemplary embodiments describe the three-phase stator coil 16 of the stator 14 is formed by connecting conductor segments. In the meantime, the arrangement of the three-phase stator coil 16 in the stator core 15 is not limited to the configuration illustrated in FIG. 1 and FIG. 2, but the stator coil can employ various arrangements, provided that the configurations have axially extending coil terminals of three phases.

Further, each of the above exemplary embodiments describes a configuration in which one member out of the resin member and the connector has a groove formed on a side face on a side facing the other member, and the other member is fitted into the groove, so that the connector is prevented from moving in one direction. However, such a configuration may be employed that a groove for fitting is not formed in either of the resin member and the connector. For example, the resin member and the connector may be formed in a generally rectangular-solid shape that does not have a groove, one member out of the resin member and the connector has a columnar projection formed on a side face on a side facing the other member, and the other member has a recessed portion formed on a side face thereof such that the recessed portion is fitted to the projection substantially without any gap. Hereby, the movement of the connector in one direction is prevented by the fitting between the projection and the recessed portion.

The invention claimed is:

1. A terminal block connection structure for a rotary electric machine including a stator coil, the stator coil having a plurality of phases, the terminal block connection structure comprising:
   a plurality of power lines connected to the stator coil, the plurality of power lines corresponding to the plurality of phases;
   a connector connected to intermediate parts of the plurality of power lines, the connector being configured to integrate the plurality of power lines;
   a bus bar unit including a plurality of bus bars and at least one resin member, the plurality of bus bars being connected to respective distal ends of the plurality of power lines, the resin member connecting the plurality of bus bars; and
   a terminal block configured such that the distal ends of the plurality of power lines are connected to the terminal block via the bus bar unit, the terminal block being configured to connect the plurality of power lines to a plurality of power-source lines, respectively, the plurality of bus bars each including:
   a first plate portion; and
   a second plate portion, the first plate portion being fixed to the terminal block, the second plate portion being bent from one end of the first plate portion, the second plate portion being configured to be connected to the distal end of the power line of a corresponding phase, wherein
   the connector is fitted to the resin member such that the resin member prevents a movement of the connector in at least one direction from among a plurality of moving directions of the connector, wherein:
   the resin member has a groove provided on a side face of the resin member, the side face facing the connection member, and
   the connector is configured to be fitted to the groove such that walls of the groove prevent the movement of the connector in the at least one direction,
   wherein
   the connector has a first projection or a recessed portion, when connector has the first projection, the resin member has a recessed portion on an inner side of the groove, and when the connector has the recessed portion, the resin member has a first projection on an inner side of the groove,
   the first projection is configured to be fitted to the recessed portion such that the first projection prevents a movement of the connector in a direction perpendicular to the at least one direction.

2. The terminal block connection structure according to claim 1, wherein each of the plurality bus bars of the bus bar unit is L-shaped.

3. The terminal block connection structure according to claim 1, wherein at least one of the plurality of bus bars is connected to the terminal block by a bolt.

4. A terminal block connection structure for a rotary electric machine including a stator coil, the stator coil having a plurality of phases, the terminal block connection structure comprising:
   a plurality of power lines connected to the stator coil, the plurality of power lines corresponding to the plurality of phases;
   a connector connected to intermediate parts of the plurality of power lines, the connector being configured to integrate the plurality of power lines;
   a bus bar unit including a plurality of bus bars and at least one resin member, the plurality of bus bars being connected to respective distal ends of the plurality of power lines, the resin member connecting the plurality of bus bars; and
   a terminal block configured such that the distal ends of the plurality of power lines are connected to the terminal block via the bus bar unit, the terminal block being configured to connect the plurality of power lines to a plurality of power-source lines, respectively, the plurality of bus bars each including:
   a first plate portion; and
   a second plate portion, the first plate portion being fixed to the terminal block, the second plate portion being bent from one end of the first plate portion, the second plate portion being configured to be connected to the distal end of the power line of a corresponding phase, wherein
   the connector is fitted to the resin member such that the resin member prevents a movement of the connector in at least one direction from among a plurality of moving directions of the connector, wherein
   the connector has a groove provided on a side face of the connector, the side face facing the resin member, and
   the resin member is configured to be fitted in the groove such that walls of the groove prevents the movement of the connector in the at least one direction, wherein
   the connector has a first projection or a recessed portion on an inner side of the groove,
   when the connector has the first projection on the inner side of the groove, the resin member has a recessed portion, and when the connector has the recessed portion on the inner side of the groove, the resin member has the first projection,
   the first projection is configured to be fitted in the recessed portion such that the first projection prevents a movement of the connector in a direction perpendicular to the at least one direction.

5. A terminal block connection structure for a rotary electric machine including a stator coil, the stator coil having a plurality of phases, the terminal block connection structure comprising:
   a plurality of power lines connected to the stator coil, the plurality of power lines corresponding to the plurality of phases;
   a connector connected to intermediate parts of the plurality of power lines, the connector being configured to integrate the plurality of power lines;
   a bus bar unit including a plurality of bus bars and at least one resin member, the plurality of bus bars being connected to respective distal ends of the plurality of power lines, the resin member connecting the plurality of bus bars; and a terminal block configured such that the distal ends of the plurality of power lines are connected to the terminal block via the bus bar unit, the terminal block being configured to connect the plurality of power lines to a plurality of power-source lines, respectively, the plurality of bus bars each including:

a first plate portion; and a second plate portion, the first plate portion being fixed to the terminal block, the second plate portion being bent from one end of the first plate portion, the second plate portion being configured to be connected to the distal end of the power line of a corresponding phase, wherein the connector is fitted to the resin member such that the resin member prevents a movement of the connector in at least one direction from among a plurality of moving directions of the connector, wherein two adjacent bus bars each include a second projection, each of the second projections project from one of the two adjacent bus bars toward the other adjacent bus bar from a side face of the first plate portion in a width-direction of the first plate portion, and the resin member is configured to embed each the second projections of the two bus bars in the resin member such that the resin member connects the two adjacent bus bars.

* * * * *